(12) United States Patent
Plavetich

(10) Patent No.: US 7,717,493 B2
(45) Date of Patent: May 18, 2010

(54) SLIDING DOOR SYSTEM

(75) Inventor: Richard Plavetich, San Diego, CA (US)

(73) Assignee: Nissan Design America, Inc., San Diego, CA (US)

(*) Notice: Subject to any disclaimer, the term of this patent is extended or adjusted under 35 U.S.C. 154(b) by 163 days.

(21) Appl. No.: 12/021,767

(22) Filed: Jan. 29, 2008

(65) Prior Publication Data

US 2009/0189412 A1 Jul. 30, 2009

(51) Int. Cl.
  *B60J 5/06* (2006.01)
(52) U.S. Cl. .............. 296/155; 296/146.7; 296/146.11; 296/148; 49/502
(58) Field of Classification Search ............ 296/146.1, 296/148, 149, 155, 146.4, 146.9, 146.11, 296/146.12; 49/502
  See application file for complete search history.

(56) References Cited

U.S. PATENT DOCUMENTS

| | | | | |
|---|---|---|---|---|
| 3,605,338 A | * | 9/1971 | Grossbach | 49/212 |
| 3,935,674 A | * | 2/1976 | Williams et al. | 49/212 |
| 4,157,846 A | * | 6/1979 | Whitcroft | 296/155 |
| 4,606,146 A | | 8/1986 | Jozefozak | |
| 5,896,704 A | | 4/1999 | Neag et al. | |
| 6,183,039 B1 | | 2/2001 | Kohut et al. | |
| 6,328,374 B1 | * | 12/2001 | Patel | 296/155 |
| 6,382,705 B1 | * | 5/2002 | Lang et al. | 296/146.12 |
| 7,000,977 B2 | * | 2/2006 | Anders | 296/155 |
| 7,243,978 B2 | * | 7/2007 | Mather et al. | 296/155 |
| 2004/0094991 A1 | * | 5/2004 | Fushimi et al. | 296/155 |
| 2005/0062313 A1 | * | 3/2005 | Barczynski et al. | 296/155 |
| 2006/0175867 A1 | | 8/2006 | Heuel et al. | |
| 2006/0249983 A1 | * | 11/2006 | Heuel et al. | 296/155 |

* cited by examiner

*Primary Examiner*—Glenn Dayoan
*Assistant Examiner*—SunSurraye Westbrook
(74) *Attorney, Agent, or Firm*—Young Basile

(57) ABSTRACT

A sliding door system for a motor vehicle, including a door that is configured to be disposed within a door opening that is formed in the vehicle body, a trim panel connected to the door, and an opening formed through the trim panel. A hinge arm extends through the opening in the trim panel and has a first end connected to the vehicle body and a second end slidably connected to the door for movement of the door between a closed position and an open position. A closure panel is moveable between a deployed position, wherein the closure panel obstructs at least a portion of the opening in the trim panel, and a stowed position, wherein the closure panel does not obstruct the opening in the trim panel.

18 Claims, 6 Drawing Sheets

SLIDING DOOR SYSTEM

FIELD OF THE INVENTION

The invention relates to the field of sliding doors for motor vehicles.

BACKGROUND

There are numerous well known sliding door systems for motor vehicles. Generally, these designs include a plurality of tracks formed either on the vehicle body or on the door, in which complementary support members are slidably disposed to allow the door to move between open and closed positions.

Previous designs have been proposed in which one or more tracks are disposed on an interior surface of the sliding door, and a support member that is pivotally connected to the vehicle body and is both pivotally and slidably connected to the tracks. To move the door from a closed position to an open position, the support member first pivots the door with respect to the vehicle body, then the tracks of the door slide with respect to the support member until the door is slid away from the door opening. Generally, in these designs, the tracks are visible from the interior of the vehicle when the door is closed.

SUMMARY

One sliding door system according to the invention is applicable to a vehicle that includes a vehicle body and a door opening formed through the vehicle body. The sliding door system includes a door that is configured to be disposed within the door opening, and a trim panel that is connected to the door. An opening is formed through the trim panel, and the opening has a front end and a rear end. The sliding door system also includes a hinge arm that extends through the opening in the trim panel. The hinge arm has a first end connected to the vehicle body and a second end slidably connected to the door for movement of the door between a closed position and an open position. In the closed position, the hinge arm extends through the opening near the rear end of the opening. In the open position, the hinge arm extends through the opening near the front end of the opening. Additionally, the sliding door system includes a closure panel that is moveable between a deployed position and a stowed position.

When the closure panel is in the deployed position, the closure panel obstructs at least a portion of the opening in the trim panel. Additionally, the closure panel may engage the trim panel adjacent to the opening in the trim panel when the closure panel is in the deployed position, and the closure panel may extend from the hinge arm to a front end of the opening. Furthermore, the door is restrained against moving from the closed position to the open position while the closure panel is in the deployed position.

When the closure panel is in the stowed position, the closure panel does not obstruct the opening in the trim panel. Furthermore, the closure panel may be transversely spaced from the trim panel when the closure panel is in the stowed position.

The sliding door system may also include a linkage for connecting the closure panel to the door that is configured to move the closure panel from the deployed position to the stowed position in response to engagement of the hinge arm with the closure panel during movement of the door from the closed position to the open position. Alternatively, the sliding door system may include an actuator for moving the closure panel from the deployed position to the stowed position prior to movement of the door from the open position to the closed position.

One method for opening and closing a vehicle door according to the invention includes the steps of providing a door having a track disposed on an interior surface thereof and a carriage slidably connected to the track, and concealing the track using a closure panel that is in a deployed position when the door is in a closed position. The method further includes the steps of revealing the track by moving the closure panel to a stowed position, and subsequently moving the door to an open position by sliding the carriage with respect to the track. While the door is in the open position, the closure panel is prevented from moving from the stowed position to the deployed position. Finally, the method includes the step of moving the door to the closed position from the open position. When the door returns to the closed position, the closure panel returns to the deployed position to conceal the track.

BRIEF DESCRIPTION OF THE DRAWINGS

The description makes reference to the accompanying drawings wherein like reference numerals refer to like parts throughout the several views, and wherein.

DETAILED DESCRIPTION

Figure 1:
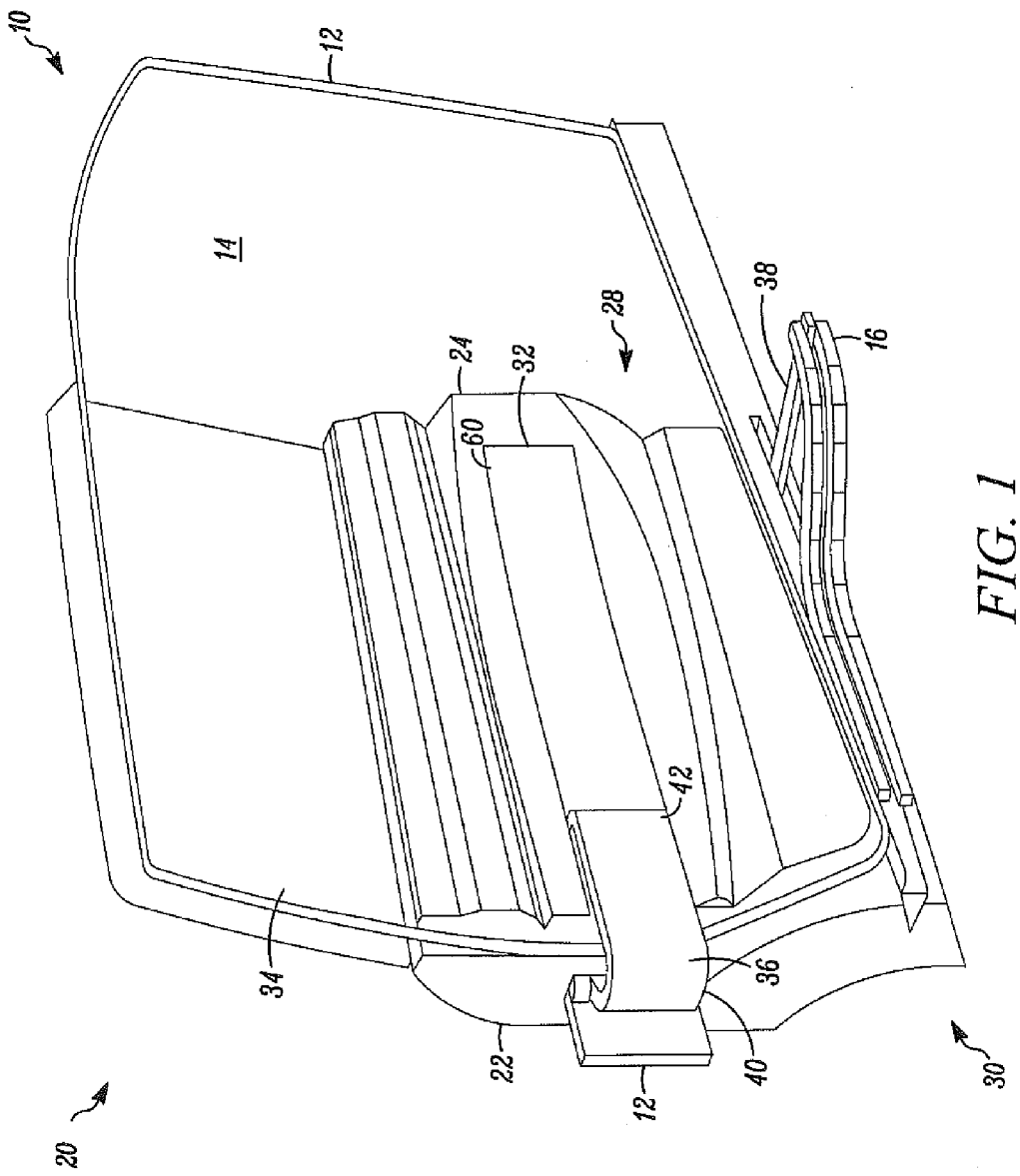
FIG. 1 is a perspective view showing a sliding door system of the invention with a door of the sliding door system disposed in a closed position.

FIGS. 1-4 show a vehicle 10 that includes a sliding door system 20 according to the invention. More particularly, the vehicle 10 includes a vehicle body 12 and a door opening 14 formed in the vehicle body 12. The sliding door system 20 includes a door 22 that is configured to be disposed within the door opening 14 in mating engagement with the vehicle body 12.

Although the sliding door system 20 is not limited to use with any particular type of vehicle, it is specifically contemplated that the vehicle 10 may be a minivan, in which one or more the sliding door systems 20 may be installed to provide access to the second and third rows of seating of the vehicle 10. Also, as shown in the figures, the door opening 14 is sized to accommodate a front door (not shown) in addition to the sliding door system 20, without provision of a B-pillar. However, the sliding door system 20 is not limited to such an application, and may be installed in a door opening that is sized to receive only the sliding door system 20, by providing a B-pillar between the door opening 14 and a separate opening (not shown) for the front door.

The door 22 of the sliding door system 20 includes a trim panel 24 that is connected to an interior surface 26 of the door 22. An opening 32 is formed through the trim panel 24. The trim panel 24 extends from a front end 28 of the door 22 to a rear end 30 of the door 22, and from the bottom of a window 34 that is formed through the door 22 above the trim panel 24 to the bottom of the door 22. Thus, when the door 22 is viewed from inside the vehicle 10, the trim panel 24 covers substantially all of the interior surface 26 of the door 22 below the window 34, with the exception of the area of the interior surface 26 of the door 22 that is adjacent to the opening 32.

Figure 2:
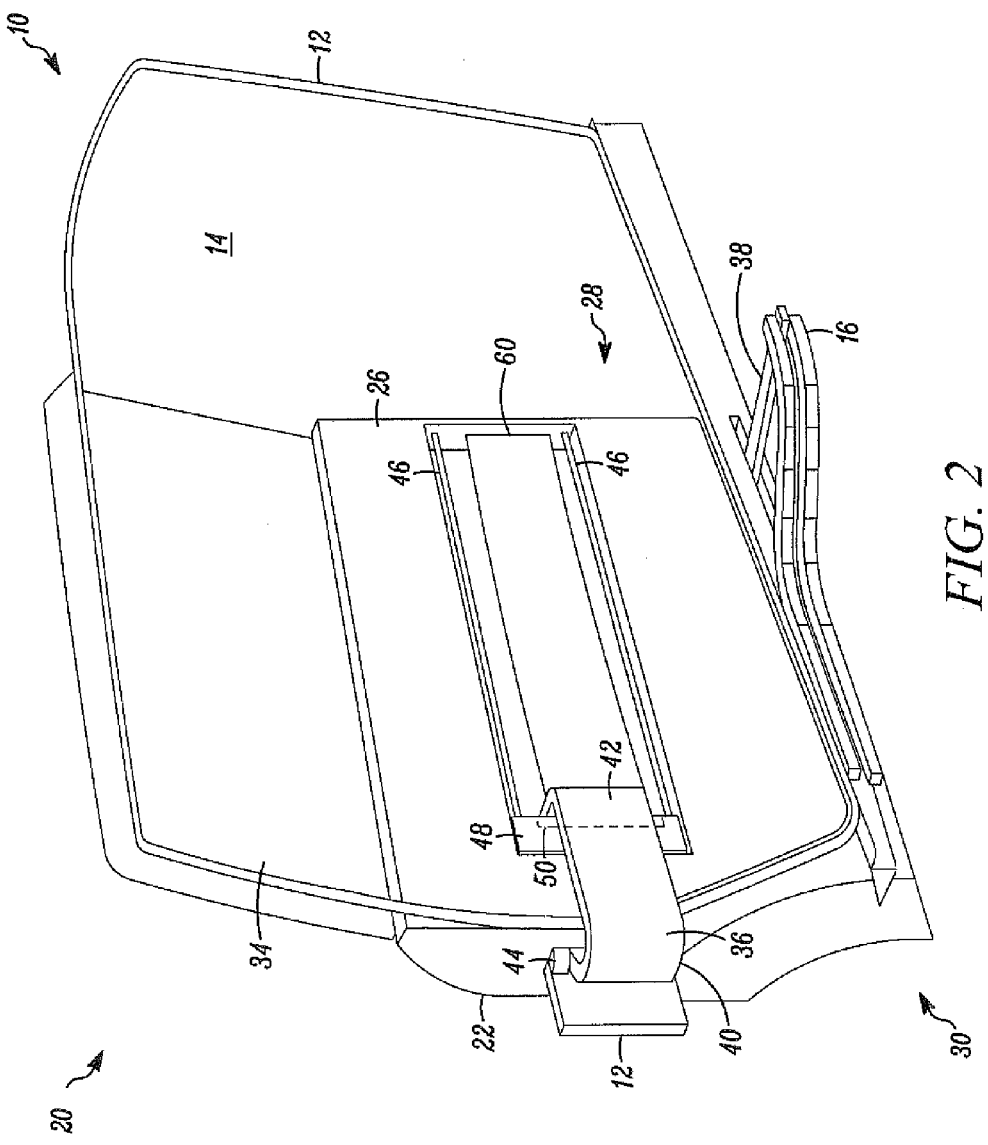
FIG. 2 is a perspective view showing the sliding door system disposed in a closed position with a trim panel is omitted so that an interior surface of the door is visible.
Figure 4:
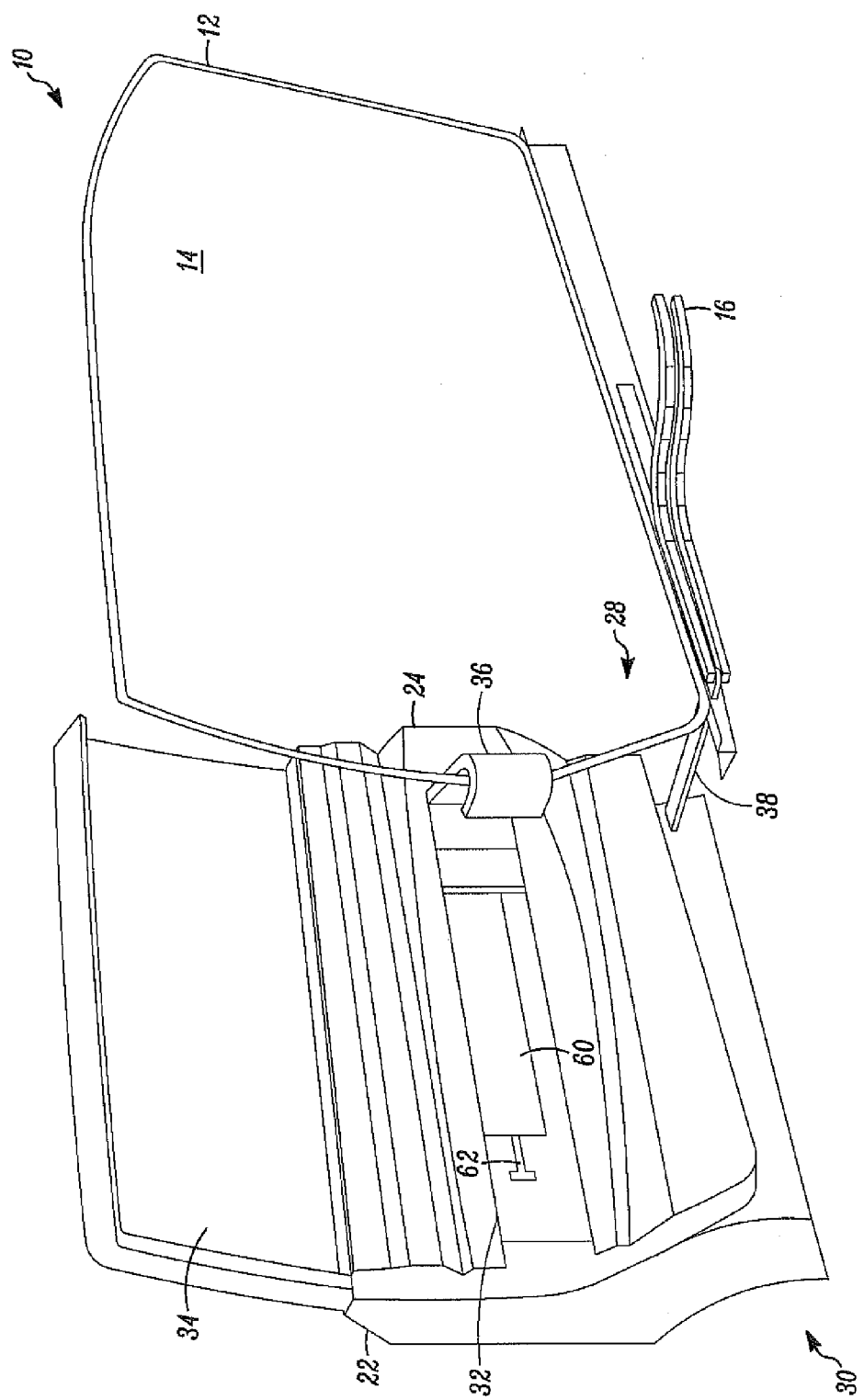
FIG. 4 is a perspective view showing the sliding door system disposed in an open position.

Two separate structures slidably connect the door 22 to the vehicle body 12 of the vehicle to guide and support the door 22 as it moves between a closed position, as seen in FIGS. 1-2, and an open position, as seen in FIG. 4. Specifically, the door 22 is slidably connected to a body track 16, and a hinge arm 36 is slidably connected to the door 22.

The body track 16 is formed on the vehicle body below the door opening 14. In order to engage the body track 16 and support the door 22 with respect to the body track 16, a support arm 38 is rigidly connected to the door 22 near the front end thereof, and is slidably engageable with the body track 16. The body track 16 is formed with a reverse curvature, to guide the door 22 away from the door opening 14 while the door 22 moves from the closed position to the open position.

The hinge arm 36 is the primary support member for supporting the door 22 with respect to the vehicle body 12. As viewed from above, the hinge arm 36 is a substantially C-shaped member. The hinge arm 36 has a first end 40 that is connected to the vehicle body 12. Opposite the first end 40, the hinge arm 36 extends through the opening 32 in the trim panel 24 and into a cavity formed between the trim panel 24 and the interior surface 26 of the door 22, where a second end 42 of the hinge arm 36 is slidably connected to the door 22.

In order to slidably connect the hinge arm 36 to the door 22, the sliding door system 20 includes a pair of door tracks 46 and a carriage 48 that is connected to the hinge arm 36. The pair of door tracks 46 includes at least two vertically spaced tracks, such as rods or channels that extend substantially horizontally from a location near the front end 28 of the door 22 to a location the rear end 30 of the door 22.

The carriage 48 is slidably connected to the pair of door tracks 46, for sliding movement with respect to the door 22 between the front and rear ends of the door tracks 46. The pair of door tracks 46 and the carriage 48 are disposed between the trim panel 24 and the interior surface 26 of the door 22. Accordingly, since the hinge arm 36 extends through the opening 32 in the trim panel 24, the range over which the carriage 36 may slide along the pair of door tracks 46 is limited by engagement of the hinge arm 36 with the front and rear extents of the opening 32.

Movement of the door 22 between the closed and open positions is accomplished manually, as the user of the vehicle 10 exerts force upon the door 22 to slide the carriage 48 with respect to the door tracks 46. However, an electric drive or other actuator (not shown) could be provided to automatically move the carriage 48 with respect to the door tracks 46.

The first end 40 of the hinge arm 36 is connected to the vehicle body 12 by a body-side hinge assembly 44. The body-side hinge assembly 44 is rigidly connected to the vehicle body 12, either directly or indirectly, and provides a substantially vertical pivot axis about which the hinge arm 36 may pivot with respect to the vehicle body 12.

To provide a pivotal connection between the hinge arm 36 and the door 22, the second end 42 of the hinge arm 36 is connected to the carriage 48 by a door-side hinge assembly 50. The door-side hinge assembly 12 is rigidly connected to the carriage 48, and provides a substantially vertical pivot axis about which the hinge arm 36 may pivot with respect to the carriage 48.

Figure 3:
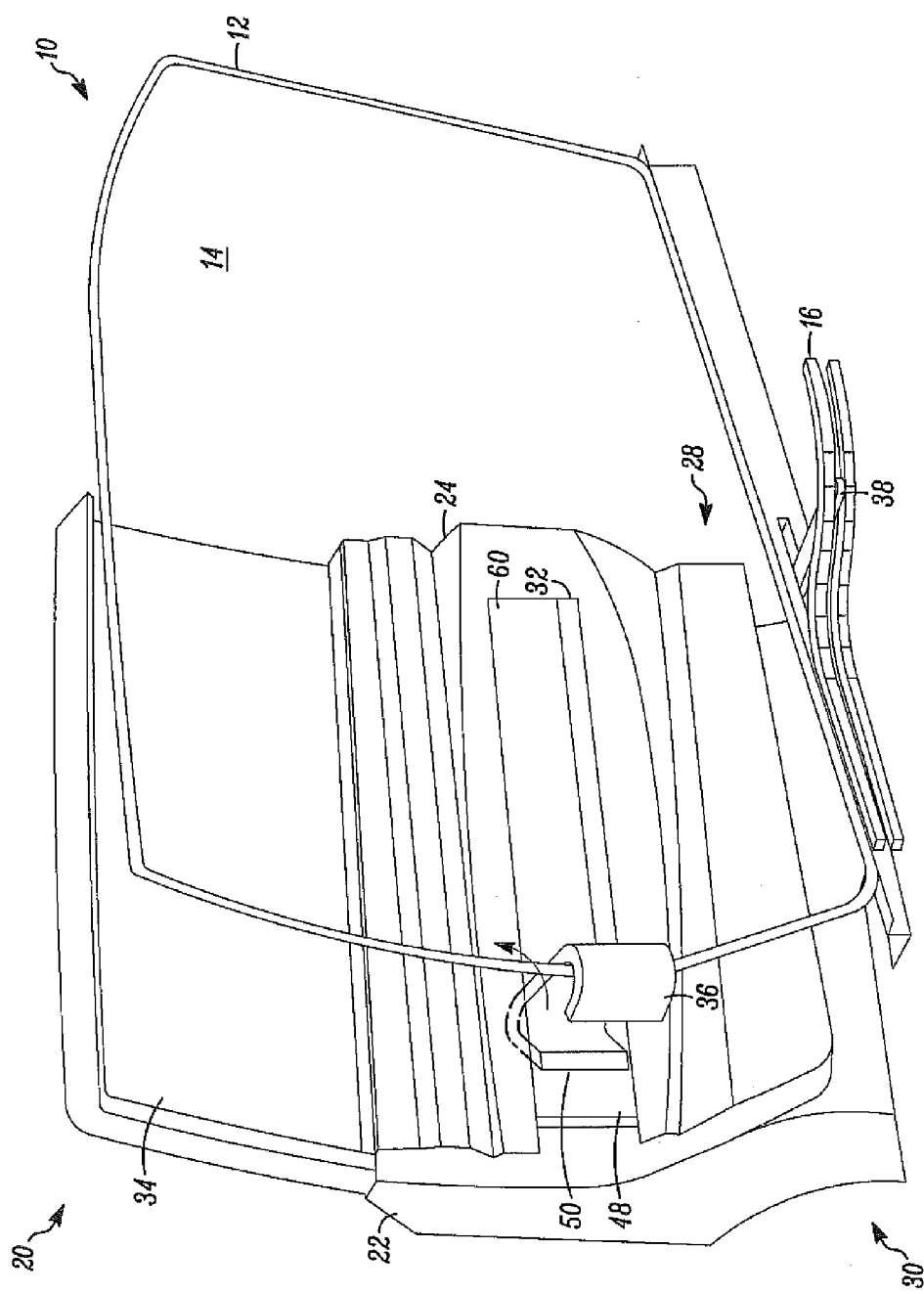
FIG. 3 is a perspective view showing the sliding door system disposed in a pivoted position.

The pivotal connection of the hinge arm 36 to both the vehicle body 12 and the carriage 48 allows the hinge arm 36 to pivot between a first angular orientation and a second angular orientation with respect to the vehicle body 12. When the hinge arm 36 is in the first angular orientation, the hinge arm 36 extends either substantially parallel or at a slight angle with respect to the door 22, for example, in a range between zero degrees and thirty degrees. Also, when the hinge arm 36 is in the first angular orientation, the door 22 is in the closed position. When the hinge arm 36 is in the second angular orientation, the hinge arm 36 extends at an angle with respect to the door 22, for example, in a range between sixty degrees and ninety degrees. Also, when the hinge arm 36 is in the second angular orientation, the door 22 is disposed either in the open position or in a pivoted position. When the door 22 is disposed in the pivoted position, the door 22 is not disposed within the door opening 14 and is in an intermediate position between the open and closed positions, as best seen in FIG. 3.

In order to block visibility of the door tracks 46, the interior surface 26 of the door 22, and the remainder of the area between the trim panel 24 and the door 22 from within the vehicle body 12 when the door 22 is in the closed position, the sliding door system 20 includes a closure panel 60. The closure panel 60 is moveable between a deployed position, shown in FIGS. 1-2, and a stowed position, shown in FIGS. 3-4.

Figure 5:
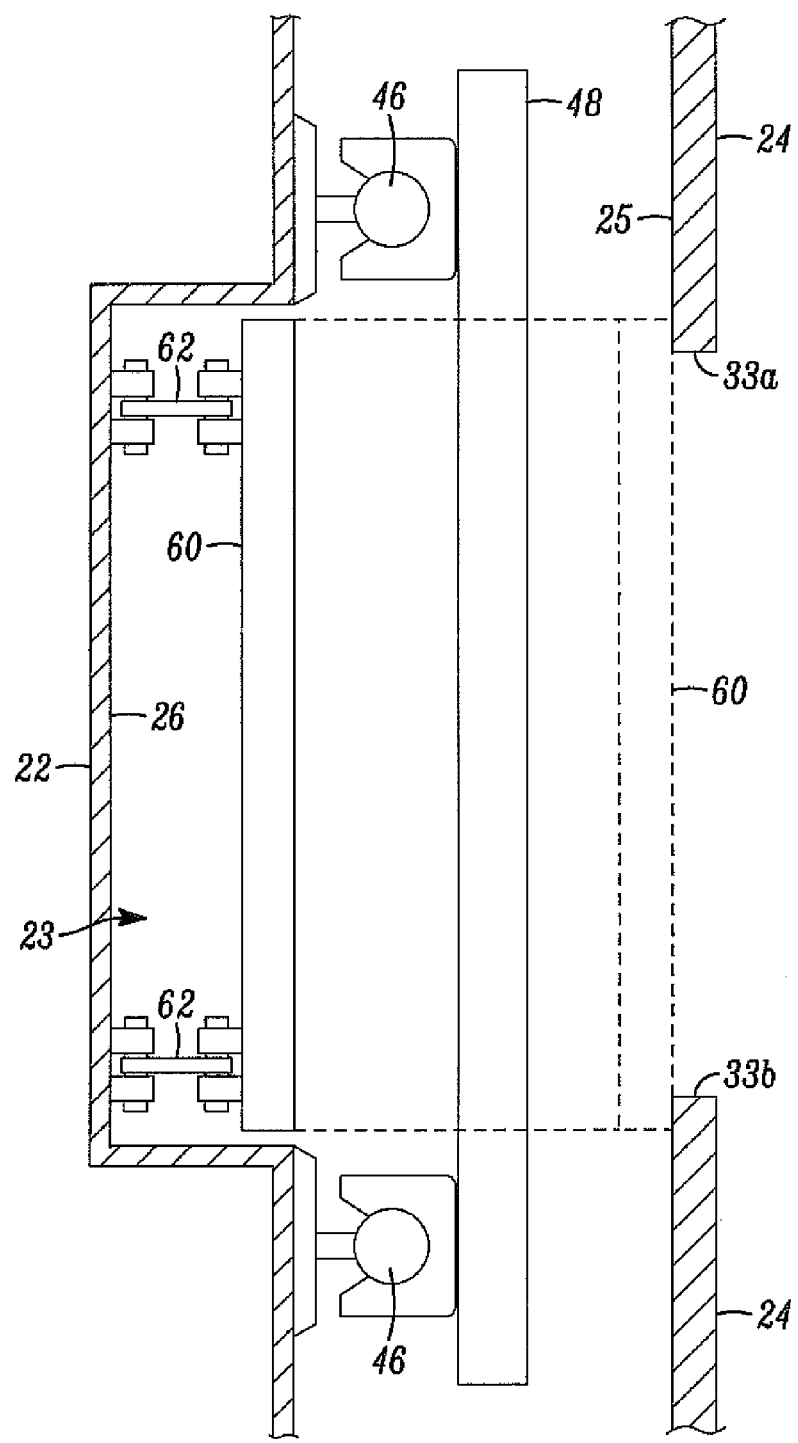
FIG. 5 is a rear cross-section view of the door.

As best seen in FIG. 5, the closure panel 60 is connected to the door 22 by a linkage 62 that is configured to allow movement of the closure panel 60 between the stowed position and the deployed position (shown in broken lines in FIG. 5). While the closure panel 60 is in the deployed position, visibility of the cavity between the trim panel 24 and the interior surface 26 of the door 22 from within the vehicle 10 is obstructed, but the carriage 48 and the hinge arm 36 are prevented from moving along the length of the opening 32. Thus, movement of the closure panel 60 between the stowed and deployed positions allows the closure panel 60 to engage an interior surface 25 of the trim panel 24 adjacent to the opening 32 in the trim panel 24 and thus obstruct the opening 32 when the closure panel 60 is in the deployed position, while also allowing the carriage 48 and the hinge arm 36 to slide with respect to the opening 32 while the closure panel 60 is in the stowed position.

The linkage 62 may be connected to the door 22 in a recessed portion 23 provided on the interior surface 26 of the door 22. The recessed portion 23 is positioned between the tracks 46 and provides clearance for the closure panel 60 to be disposed between the carriage 48 and the interior surface 26 of the door 22 when the closure panel 60 is in the stowed position. Since the closure panel 60 is disposed between the interior surface 26 of the door 22 and the carriage 48 when the closure panel 60 is in the stowed position, the closure panel 60 does not obstruct the opening 32 or prevent movement of the carriage 48 or the hinge arm 36 when the closure panel 60 is in the stowed position.

When the closure panel 60 moves between the stowed and deployed positions, the closure panel 60 moves laterally with respect to the door 22, across the plane of travel of the carriage 48. Accordingly, the height of the closure panel 60 is less than the distance between the door tracks 46, so that the closure panel 60 may move past the door tracks 46. However, when the closure panel 60 is in the deployed position, the closure panel 60 engages the trim panel 24 both above an upper edge 33a of the opening 32 and below a lower edge 33b of the opening 32. Thus, the height of the closure panel 60 is greater than the distance between the upper edge 33a of the opening 32 and the lower edge 33b of the opening 32. Of course, the distance between the upper edge 33a and the lower edge 33b of the opening 32 is dictated by the height of the hinge arm 36, since the hinge arm 36 extends through the opening 32. Finally, an upper track of the door tracks 46 is disposed above the upper edge 33a of the opening 32, while a lower track of the door tracks 46 is disposed below the lower edge 33b of the opening 32.

The closure panel 60 is configured to completely occupy the opening 32 when the closure panel 60 is in the deployed position. However, since the hinge arm 36 always extends through the opening 32, the closure panel 60 need not block the portion of the opening 32 that is occupied by the hinge arm 36 in order to completely occupy the opening 32. Additionally, the closure panel 60 is generally planar, and has a finished or decorative outer surface that is presented toward the interior of the vehicle 10 while the closure panel 12 is in the deployed position. For example, the closure panel 60 may be clad in leather or a wood veneer, or may be fabricated from textured plastic. Alternatively, the closure panel 60 may be fabricated from a flexible material.

Although the description and figures specifically contemplate that movement of the closure panel 60 between the stowed and deployed positions may be accomplished by moving the closure panel 60 laterally with respect to the door 22, across the plane of travel of the carriage 48, the invention is not necessarily limited in this manner. Rather, movement of the closure panel between the stowed and deployed positions could be performed by alternative structures, for example, by structures configured to slide the closure panel 60 between deployed and stowed positions, or in the case of a flexible closure panel 60, by rolling-up the closure panel 60 from the deployed position to the stowed position.

Figure 6A:
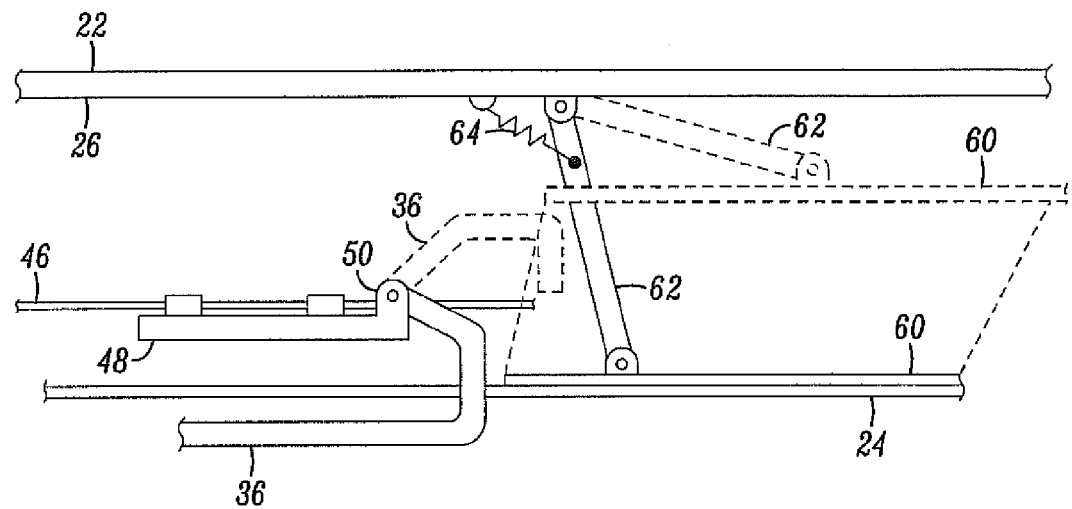
FIG. 6A is a top cross-section view of the door of the sliding door system showing a mechanically actuated closure panel.

Movement of the closure panel 60 between the stowed and deployed positions may be accomplished by engagement of the hinge arm 36 with the closure panel 60, as shown in FIG. 6A. As the hinge arm 36 moves from the first angular orientation toward the second angular orientation (shown in broken lines in FIG. 6A), the hinge arm 36 engages the closure panel 60. Engagement of the hinge arm 36 with the closure panel 60 causes the closure panel 60 to move toward the door 22 upon the linkage 62, until the closure panel 60 reaches the stowed position. In order to return the closure panel 60 to the deployed position, a biasing element 64, such as a spring, may be provided on the linkage 62 for biasing the closure panel 60 toward the deployed position.

Figure 6B:
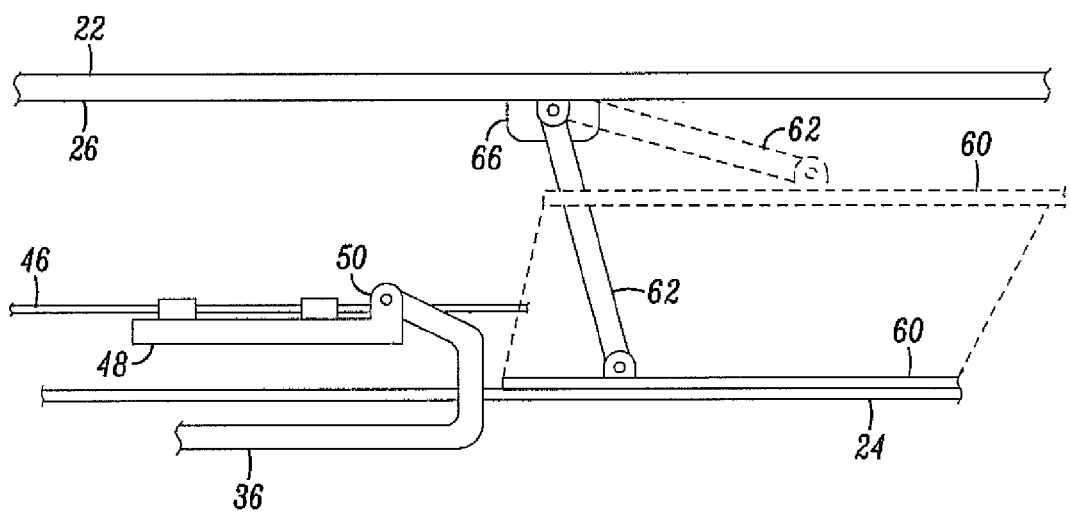
FIG. 6B is a top cross-section view of the door of the sliding door system showing a motor driven closure panel.

Alternatively, movement of the closure panel 60 between the stowed and deployed positions may be accomplished by providing an actuator 66, such as an electric rotary motor, as shown in FIG. 6B. Specifically, the actuator 66 is connected to the linkage 62, and is configured to pivot the linkage 62, and thus drive the closure panel 60 between the stowed and deployed positions.

In use, the door 22 of the vehicle 10 is in the closed position during operation of the vehicle 10, and thus disposed within the door opening 14 of the vehicle body 12. When the vehicle 10 is stopped, and a user of the vehicle 10 wishes to perform a loading or unloading operation, the user may do so using the sliding door system 20 to move the door 22 to the open position. Initially, the door 22 is disposed in the closed position and the closure panel 60 is disposed in the deployed position. The user then exerts force upon the door 22 to begin moving the door 22 from the closed position toward the open position. As the user does so, the hinge arm 36 pivots from the first angular orientation to the second angular orientation, and the support arm 38 traverses the reverse curvature of the body track 16. At the same time, the closure panel 60 moves from the deployed position to the stowed position. The door 22 is now disposed in the pivoted position, between the open and closed positions, and the door 22 is no longer disposed in the door opening 14 of the vehicle body 12. As the user continues to exert force upon the door 22, the carriage 48 slides with respect to the door tracks 48, thereby moving the hinge arm 36 from the rear end of the opening 32 in the trim panel 24 of the door 22 to the front end of the opening 32. After the hinge arm 36 reaches the front end of the opening 32 in the trim panel 24 of the door 22, the door 22 is in the open position, and the user performs the loading or unloading operation. The user then closes the door 22 by reversing the sequence of opening the door 22.

While the invention has been described in connection with what is presently considered to be the most practical and preferred embodiment, it is to be understood that the invention is not to be limited to the disclosed embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law.

What is claimed is:

1. A sliding door system for a vehicle, the vehicle including a vehicle body having a door opening formed therein, the sliding door system comprising:
   a door configured to be disposed within the door opening;
   a trim panel connected to the door;
   an opening formed through the trim panel, the opening having a front end and a rear end;
   a hinge arm that extends through the opening in the trim panel, the hinge arm having a first end connected to the vehicle body and a second end slidably connected to the door for movement of the door between a closed position, wherein the hinge arm extends through the opening near the rear end thereof, and an open position, wherein the hinge arm extends through the opening near the front end thereof; and
   a closure panel moveable between a deployed position, wherein the closure panel obstructs at least a portion of the opening in the trim panel, and a stowed position, wherein the closure panel does not obstruct the opening in the trim panel.

2. The sliding door system of claim 1, wherein the closure panel engages the trim panel adjacent to the opening in the trim panel when the closure panel is in the deployed position.

3. The sliding door system of claim 2, wherein the closure panel extends from the hinge arm to a front end of the opening when the closure panel is in the deployed position.

4. The sliding door system of claim 1, wherein the closure panel is transversely spaced from the trim panel when the closure panel is in the stowed position.

5. The sliding door system of claim 1, wherein the door is restrained against moving from the closed position to the open position while the closure panel is in the deployed position.

6. The sliding door system of claim 1, further comprising:
   a linkage for connecting the closure panel to the door, wherein the linkage is configured to move the closure panel from the deployed position to the stowed position in response to engagement of the hinge arm with the closure panel during movement of the door from the closed position to the open position.

7. The sliding door system of claim 1, further comprising:
an actuator for moving the closure panel from the deployed position to the stowed position prior to movement of the door from the open position to the closed position.

8. The sliding door system of claim 1, further comprising:
a cavity defined between the door and the trim panel, wherein the opening in the trim panel is in communication with the cavity and the closure panel is configured to block visibility of the cavity from within the vehicle body when the door is in the closed position.

9. The sliding door system of claim 1, further comprising:
a cavity defined between the door and the trim panel, wherein the second end of the hinge arm is disposed within the cavity.

10. A vehicle, comprising:
a vehicle body having a door opening formed therein;
a door configured to be disposed within the door opening;
a body track formed on the vehicle body below the door opening;
a support arm connected to the door and slidably engageable with the body track;
a plurality of door tracks connected to an interior surface of the door;
a carriage slidably connected to the door tracks for movement between a front end of the door tracks and a rear end of the door tracks;
a trim panel connected to the interior surface of the door, wherein the door tracks and the carriage are disposed between said trim panel and the door;
an opening formed through the trim panel adjacent to the door tracks;
a hinge arm that extends through the opening in the trim panel, the hinge arm having a first end pivotally connected to the vehicle body and a second end pivotally connected to the carriage, wherein the carriage, the door tracks, and the hinge aim cooperate to move the door from a closed position, wherein the door is disposed within the door opening and the carriage is disposed at the rear end of the door tracks, and an open position, wherein the door is not disposed within the door opening and the carriage is disposed at the front end of the door tracks; and
a closure panel configured to block visibility of the door tracks from within the vehicle body when the door is in the closed position, the closure panel moveable between a deployed position, wherein the closure panel engages the trim panel adjacent to the opening to thereby occupy at least a portion of the opening in the trim panel, and a stowed position, wherein the closure panel does not occupy the opening in the trim panel.

11. The vehicle of claim 10, further comprising:
the opening having an upper edge and a lower edge, wherein a first track of the plurality of door tracks is disposed above the upper edge of the opening and a second track of the plurality of door tracks is disposed below the lower edge of the opening.

12. The vehicle of claim 11, wherein the closure panel has a height greater than the distance from the upper edge of the opening to the lower edge of the opening.

13. The vehicle of claim 12, wherein the closure panel engages the trim panel adjacent to the opening in the trim panel when the closure panel is in the deployed position.

14. The vehicle of claim 10, wherein the closure panel is disposed between the carriage and the door when the closure panel is in the stowed position and the closure panel is disposed between the interior surface of the door and the carriage when the closure panel is in the deployed position.

15. The vehicle of claim 10, wherein the closure panel extends from the hinge arm to a front end of the opening when the door is in the closed position.

16. The vehicle of claim 10, wherein the closure panel is transversely spaced from the trim panel when the closure panel is in the stowed position.

17. The vehicle of claim 10, wherein the door is restrained against moving from the closed position to the open position while the closure panel is in the deployed position.

18. A method for opening and closing a vehicle door, comprising:
providing a door having a track disposed on an interior surface thereof and a carriage slidably connected to the track;
concealing the track using a closure panel when the door is in a closed position, wherein the closure panel is in a deployed position when the door is in the closed position;
revealing the track by moving the closure panel to a stowed position;
moving the door to an open position by sliding the carriage with respect to the track after revealing the track, wherein the closure panel is prevented from moving from the stowed position to the deployed position while the door is in the open position; and
moving the door to the closed position from the open position, wherein the closure panel returns to the deployed position to conceal the track.

* * * * *